United States Patent
Mang et al.

(10) Patent No.: US 9,468,016 B2
(45) Date of Patent: *Oct. 11, 2016

(54) METHOD AND APPARATUS FOR PRIORITIZING VOICE OVER INTERNET PROTOCOL SIGNALING MESSAGES

(71) Applicant: AT&T Intellectual Property I, L.P., Atlanta, GA (US)

(72) Inventors: Xiaowen Mang, Morganville, NJ (US); Carolyn Roche Johnson, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,997

(22) Filed: Jun. 15, 2015

(65) Prior Publication Data

US 2015/0358992 A1 Dec. 10, 2015

Related U.S. Application Data

(63) Continuation of application No. 13/620,221, filed on Sep. 14, 2012, now Pat. No. 9,060,037, which is a continuation of application No. 12/210,701, filed on Sep. 15, 2008, now Pat. No. 8,305,890.

(51) Int. Cl.
| | | |
|---|---|---|
| H04W 4/00 | (2009.01) | |
| H04W 72/12 | (2009.01) | |
| H04W 72/04 | (2009.01) | |
| H04M 7/00 | (2006.01) | |
| H04L 12/823 | (2013.01) | |
| H04M 3/36 | (2006.01) | |
| H04L 29/06 | (2006.01) | |
| H04L 29/08 | (2006.01) | |

(52) U.S. Cl.
CPC .......... *H04W 72/1242* (2013.01); *H04L 47/32* (2013.01); *H04L 65/1006* (2013.01); *H04L 65/1033* (2013.01); *H04L 67/322* (2013.01); *H04M 3/367* (2013.01); *H04M 7/0093* (2013.01); *H04W 72/0486* (2013.01)

(58) Field of Classification Search
None
See application file for complete search history.

(56) References Cited

U.S. PATENT DOCUMENTS

| | | |
|---|---|---|
| 6,614,790 B1 | 9/2003 | Veres et al. |
| 7,339,899 B2 | 3/2008 | Liu et al. |
| 7,688,727 B1 * | 3/2010 | Ferguson ............ H04L 49/3009 370/230.1 |
| 7,813,348 B1 | 10/2010 | Gupta et al. |
| 8,305,890 B2 | 11/2012 | Mang et al. |
| 9,060,037 B2 | 6/2015 | Mang et al. |
| 2003/0016625 A1 | 1/2003 | Narsinh et al. |
| 2004/0022246 A1 | 2/2004 | Davies et al. |
| 2005/0105464 A1 | 5/2005 | Acharya et al. |
| 2007/0041390 A1 | 2/2007 | Tatar et al. |
| 2008/0243386 A1 | 10/2008 | Kumar et al. |
| 2008/0253387 A1 | 10/2008 | Liang et al. |

* cited by examiner

*Primary Examiner* — Minh-Trang Nguyen

(57) ABSTRACT

A method and apparatus for enabling prioritization of signaling messages in a communication network are disclosed. For example, the method receives at least one signaling message, and classifies each of the at least one signaling message. The method schedules each of the at least one signaling message for processing, and discards selectively one or more signaling messages that have been scheduled under an overload condition.

18 Claims, 12 Drawing Sheets

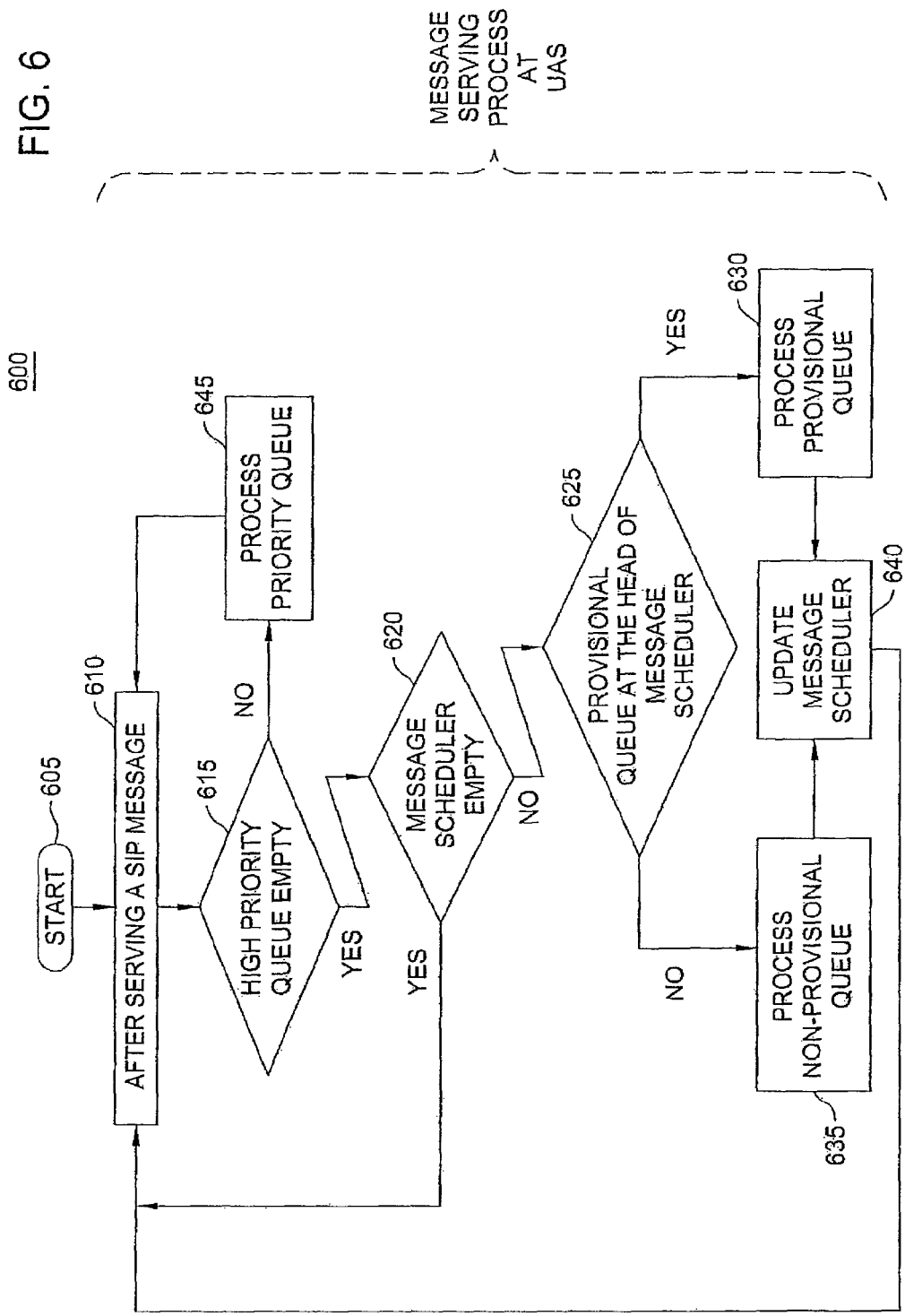

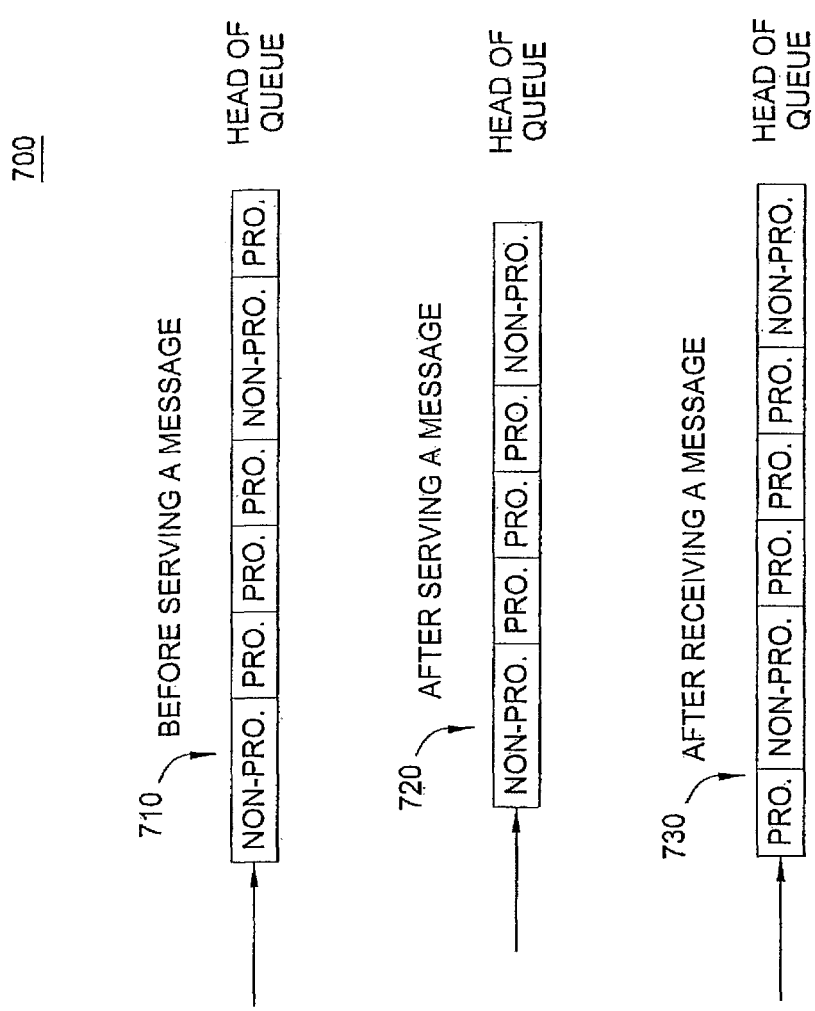

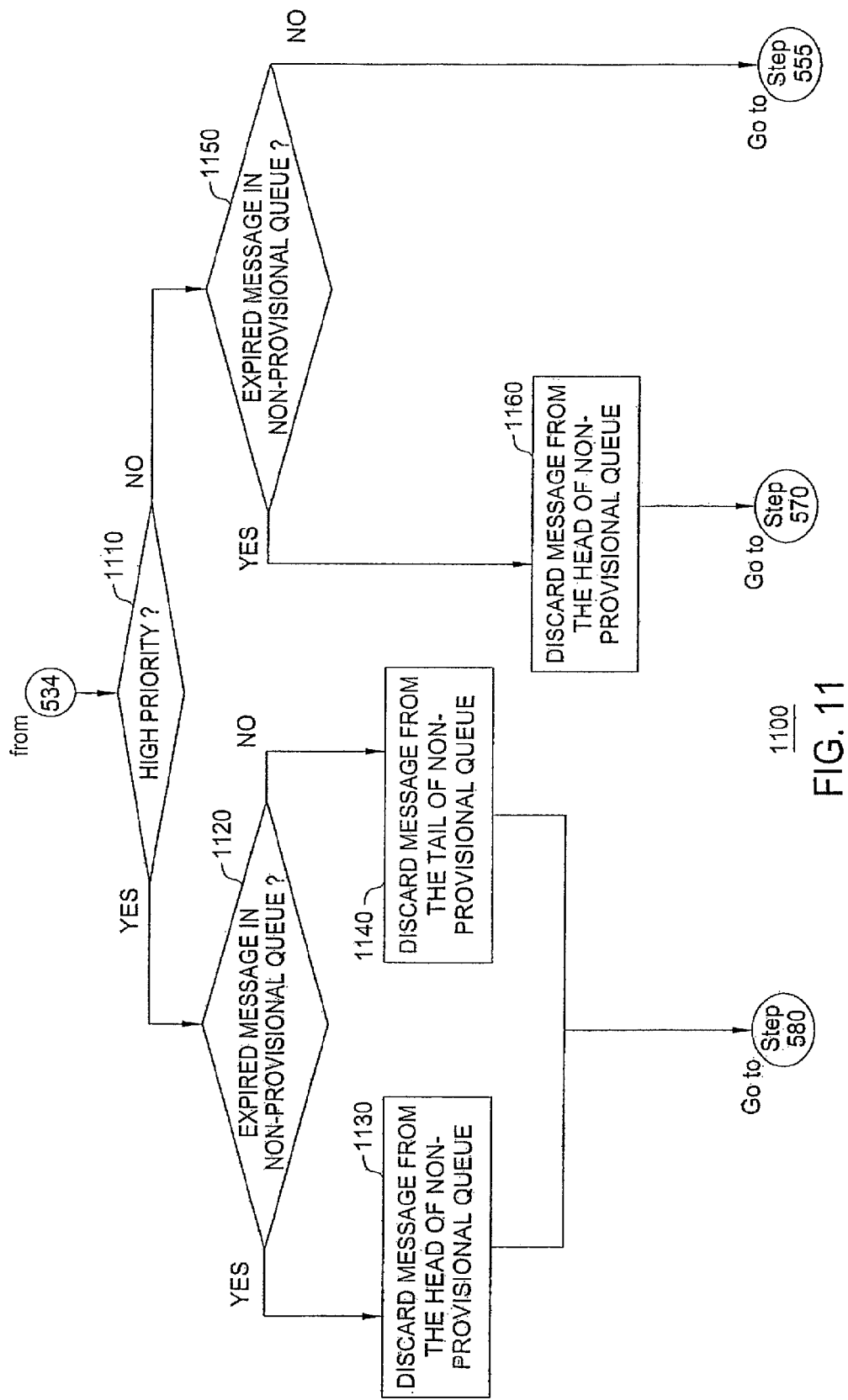

METHOD AND APPARATUS FOR PRIORITIZING VOICE OVER INTERNET PROTOCOL SIGNALING MESSAGES

This application is a continuation of U.S. patent application Ser. No. 13/620,221, filed Sep. 14, 2012, now U.S. Pat. No. 9,060,037, which is a continuation of U.S. patent application Ser. No. 12/210,701, filed Sep. 15, 2008, now U.S. Pat. No. 8,305,890, all of which are herein incorporated by reference in their entirety.

The present invention relates generally to communication networks and, more particularly, to a method and apparatus for prioritizing signaling messages in communication networks, e.g., packet networks such as Voice over Internet Protocol (VoIP) networks.

BACKGROUND OF THE INVENTION

In a well engineered network, signaling servers will not be overloaded under the normal operation mode. However, overload will occur if there are failures in the network or if there are significant increases in traffic load beyond the engineered loads. This can be the results of a disaster or mass calling due to a popular event such as reality TV shows, etc. In the former scenario, if the failures affect some signaling servers, the surviving servers will have to handle extra calls attempts. In the latter scenario, call attempts are generated so that call volumes are significantly higher than under normal operating mode.

SUMMARY OF THE INVENTION

In one embodiment, the present invention enables prioritization of signaling messages in a communication network. For example, the method receives at least one signaling message, and classifies each of the at least one signaling message. The method schedules each of the at least one signaling message for processing, and discards selectively one or more signaling messages that have been scheduled under an overload condition.

BRIEF DESCRIPTION OF THE DRAWINGS

The teaching of the present invention can be readily understood by considering the following detailed description in conjunction with the accompanying drawings, in which:

FIG. 6 illustrates a flowchart of a method for serving signaling messages in signaling message queues at a User Agent Server (UAS) in a packet network, e.g., a VoIP network, of the present invention;

FIG. 7 illustrates an example message scheduler in a VoIP network of the present invention;

FIG. 11 illustrates a flowchart of a method for discarding signaling message from a non-provisional queue using time expiration in a packet network, e.g., a VoIP network, of the present invention.

To facilitate understanding, identical reference numerals have been used, where possible, to designate identical elements that are common to the figures.

DETAILED DESCRIPTION

Figure 1:
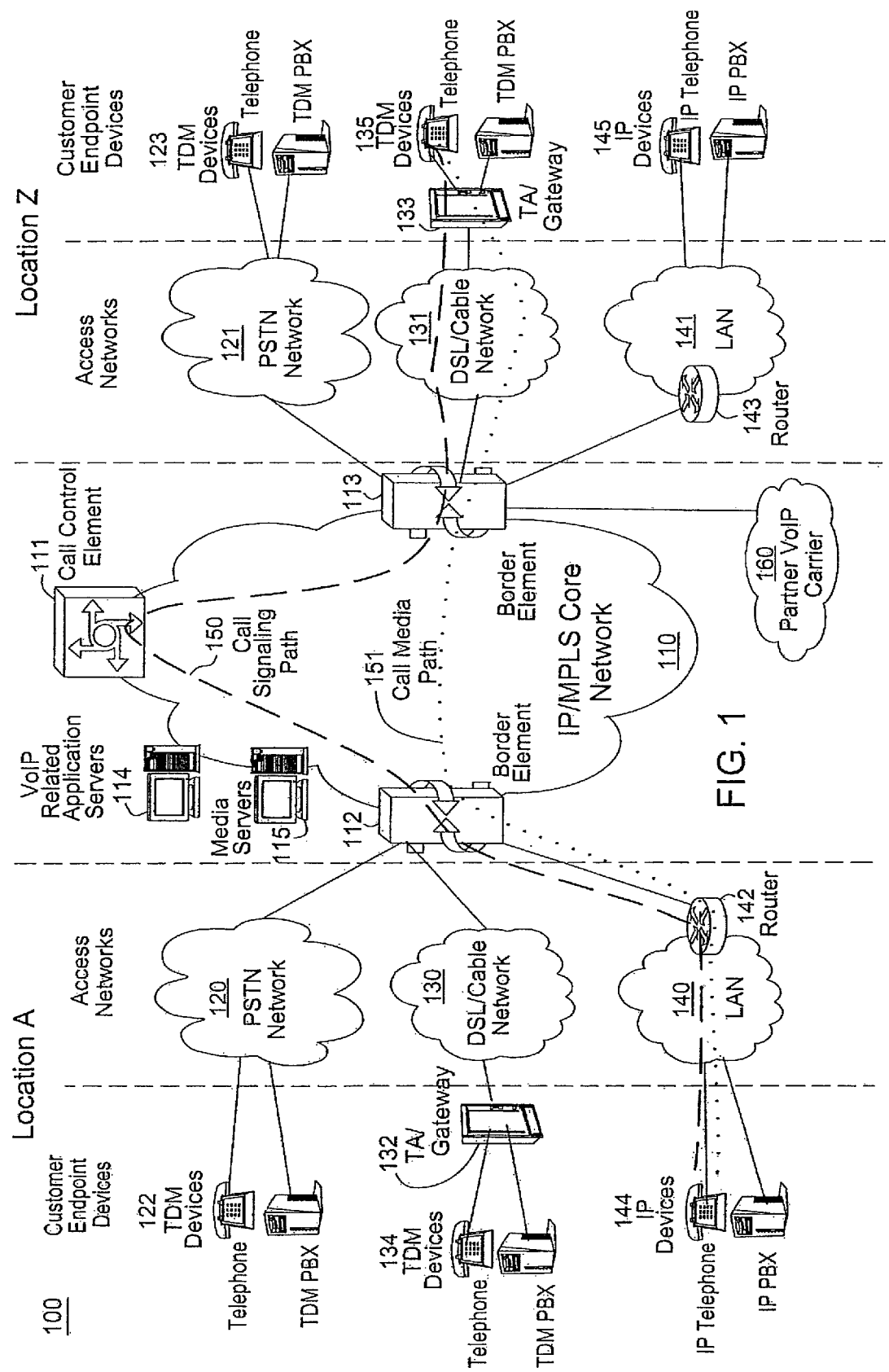
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network, a SoIP (Service over Internet Protocol) network, or an IMS (IP Multimedia Subsystem) network is built on an IP network.

In one embodiment, the VoIP network may comprise various types of customer endpoint devices connected via various types of access networks to a carrier (e.g., a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. However, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA)/VoIP Gateway (Gateway) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA/Gateway 132 or 133. IP based customer endpoint devices access VoIP services by using a Local Area Network (LAN) 140 and 141 with a router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a router 142. A packet based access network 130 or 131, such as DSL or Cable, when used together with a TA/Gateway 132 or 133, is used to support TDM based customer endpoint devices.

The core VoIP infrastructure comprises several VoIP components, such as the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway or a Session Border Controller and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller, a softswitch, or a Call Session Control Function in an IMS network and performs network wide call control related functions as well as interacts with the appropriate VoIP service related servers when necessary. The CCE functions is a signaling endpoint for all call legs between all BEs and the CCE. The CCE may need to interact with various VoIP related Application Servers (AS) in order to complete a call that require certain service specific features, e.g. call waiting, call forwarding, voice mail, etc.

Calls that originate or terminate in a different carrier can be handled through the PSTN 120 and 121 or the Partner IP Carrier 160 interconnections. Originating or terminating TDM calls can be handled via existing PSTN interconnections to the other carrier. Originating or terminating VoIP calls can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the Router 142, and the associated packet based access network, to BE 112. BE 112 will then send a setup signaling message, such as a SIP-INVITE message if SIP is used, to CCE 111. CCE 111 processes the called party information and queries the necessary VoIP service related application server 114 to obtain the information to complete this call. In one embodiment, the Application Server (AS) functions as a SIP back-to-back user agent. If BE 113 needs to be involved in completing the call, then the CCE 111 sends another call setup message, such as a SIP-INVITE message if SIP is used, to BE 113. Upon receiving the call setup message, BE 113 forwards the call setup message, via broadband network 131, to TA/Gateway 133. TA/Gateway 133 then identifies the appropriate TDM device 135 and rings that device.

Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, towards the calling party. In addition, the CCE 111 also provides the necessary information of the call to both BE 112 and BE 113 so that the media exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the media path for actual direct media exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Media Servers (MS) 115 are special servers that typically handle and terminate media streams, and to provide services such as announcements, teleconference bridges, transcoding, and Interactive Voice Response (IVR) messages for VoIP service applications.

VoIP services have proliferated in recent years due to rapid advance in technology and market demands. Service providers are aggressively looking for ways to offer VoIP to customers via various Quality of Service (QoS) mechanisms. However, the existing discussions on providing QoS to VoIP traffic primarily focus on the VoIP call media path such as how to ensuring voice quality after calls are accepted. Little has been done on providing QoS treatment for VoIP signaling messages, such as SIP signaling messages, especially at SIP servers that are involved in setting up VoIP calls. In one embodiment of the present invention, CCE 111 shown in FIG. 1 is a SIP server.

Providing QoS treatment for VoIP signaling messages at SIP servers is beneficial when SIP servers are overloaded. In a well engineered network, SIP servers will not be overloaded under the normal operation mode. However, overload will occur if there are failures in the network or if there are significant increases in traffic load beyond the engineered loads.

When SIP servers are overloaded, signaling messages will be dropped at the SIP servers. The dropped signaling messages may be signaling messages that need to be treated with higher priority. For example, calls from callers such as government emergency control agents that manage or assist in the rescue efforts in a disaster, should be handled with priority. To prevent signaling message dropping of important calls, QoS features have to be implemented at SIP servers so that important messages will always be processed even under overload conditions.

The present invention enables differential QoS treatments of various signaling messages at signaling servers. In one embodiment, the present invention employs three components: classification of signaling messages, scheduling of signaling messages for processing, and selective discarding of signaling messages under overload conditions, to support differential QoS treatments of signaling messages. Signaling message are first classified to different priority levels and then scheduled to be processed and, if necessary, when memory space runs out, discarded by a signaling server according to their classified priority levels.

Figure 2:
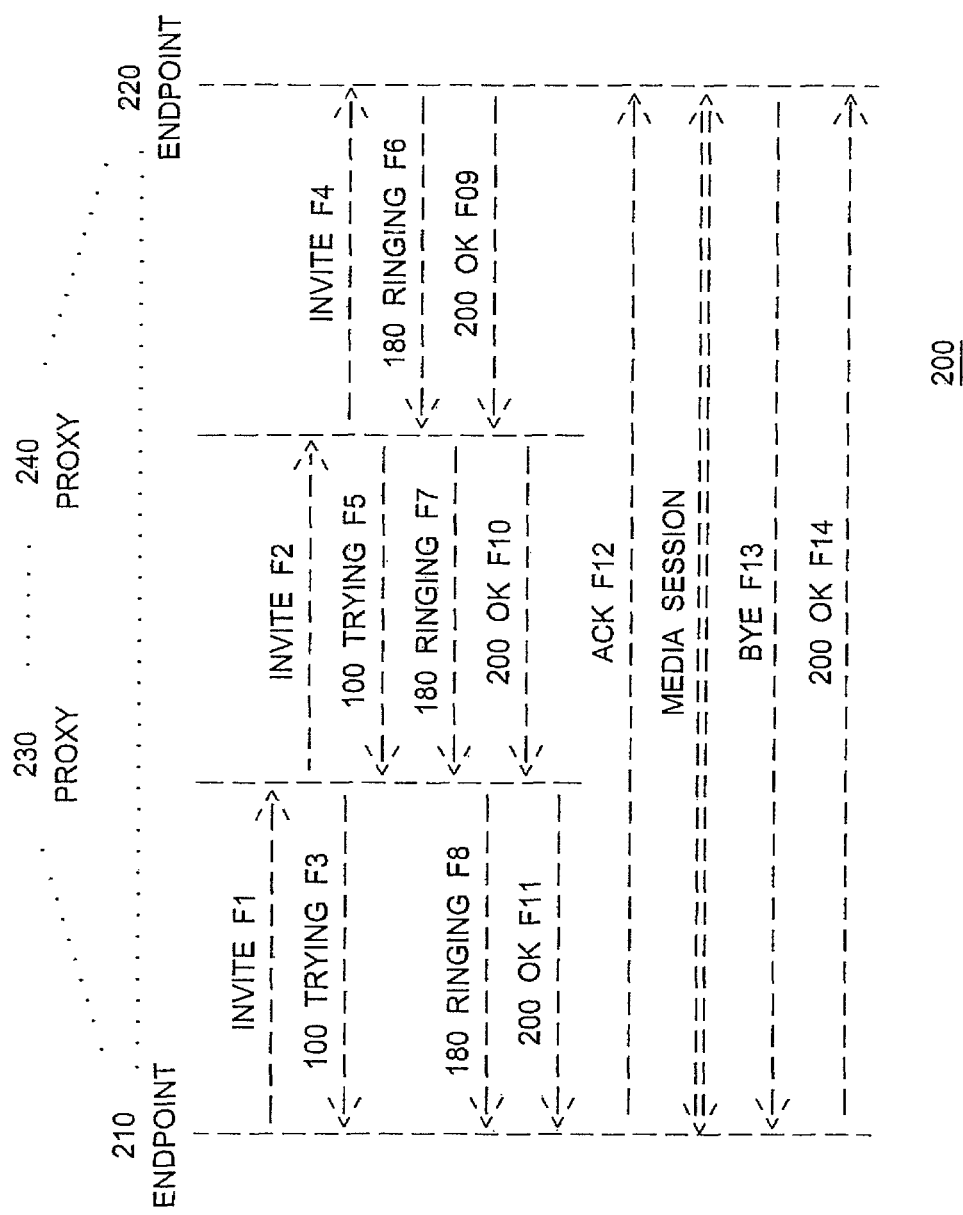
FIG. 2 illustrates an example signaling flow for a call setup using SIP signaling messages in a VoIP network of the present invention.

FIG. 2 provides an example signaling flow 200 for a call setup using SIP signaling messages. In FIG. 2, endpoint 210 initiates a call setup request towards endpoint 220 via a proxy 230 and a proxy 240 as shown. In this example, endpoint 210 and endpoint 220 are User Agent Clients (UAC) and proxy 230 and proxy 240 are User Agent Server (UAS) for SIP signaling purposes. User Agent Client (UAC) is a logical entity that creates a new SIP request and then sends it to the network. User Agent Server (UAS) is a logical entity that generates a response to a SIP request. The response accepts, rejects, or redirects the request.

For instance, SIP INVITE message F1 is generated and sent by endpoint 210 to proxy 230. Upon receiving INVITE message F1, proxy 230, acting as both a UAC and a UAS, generates and forwards an INVITE message F2 to proxy 240. In addition, proxy 230, acting both as a UAC and a UAS, also responds to INVITE message F1 by generating and sending the SIP 100 TRYING message F3 to endpoint 210.

Upon receiving INVITE message F2, proxy 240 generates and forwards INVITE message F4 to endpoint 220 in response to INVITE message F2. In addition, proxy 240 also generates a SIP 100 TRYING message F5 to proxy 230 in response to INVITE message F2. The rest of the signaling message flows can be similarly interpreted. Note that once a call is setup between the two endpoints, the endpoints can then signal each other directly without going through the proxies. For instance, SIP ACK message F12, BYE message F13, and 200 OK message F14 are such directly exchanged signaling message between endpoint 210 and endpoint 220. The media session flow represents the call media path and flow between endpoint 210 and endpoint 220.

In one embodiment, the classification component of the present invention decides which message gets higher priority than others. For example, a two-tier classification approach is introduced. In the first tier, calls are categorized into two classes, a high priority class and a low priority class. The high priority class comprises signaling messages that are more important than those of low priority class. The criteria of such categorization can be flexibly configured by individual service providers. For instance, calls originated from government emergency agents (e.g., government employees (federal, state, city, county, etc.), medical personnel, utility employees, and so on) can be classified as the high priority class. In the second tier, signaling messages from the low priority class of calls are further classified into two classes based upon the nature of the messages. For instance, the SIP call INVITE and BYE messages can be configured to have higher priority than other SIP signaling messages, such as 1xx messages comprising provisional responses. Again, the actual classification criteria within the lower priority class can be flexibly configured by individual service providers. SIP messages of different classes will then be queued separately so that they can be served in a differential manner.

This illustrative two tier classification structure is based upon both the call type and the SIP signaling message type. Though one can define as many classes as it is needed, in one embodiment, a three class structure using this two tier classification is used:

Class 1: all SIP messages associated with high priority calls;
Class 2: important SIP signaling messages from low priority calls, also know as non-provisional signaling messages; and
Class 3: non-important SIP signaling messages from lower priority calls, also know as provisional messages.

Note that the number of high priority calls should be restricted to a small percentage of all call types. Therefore, the amount of signaling message traffic of high priority calls shall be engineered to never overload any signaling servers in a VoIP network.

Figure 3:
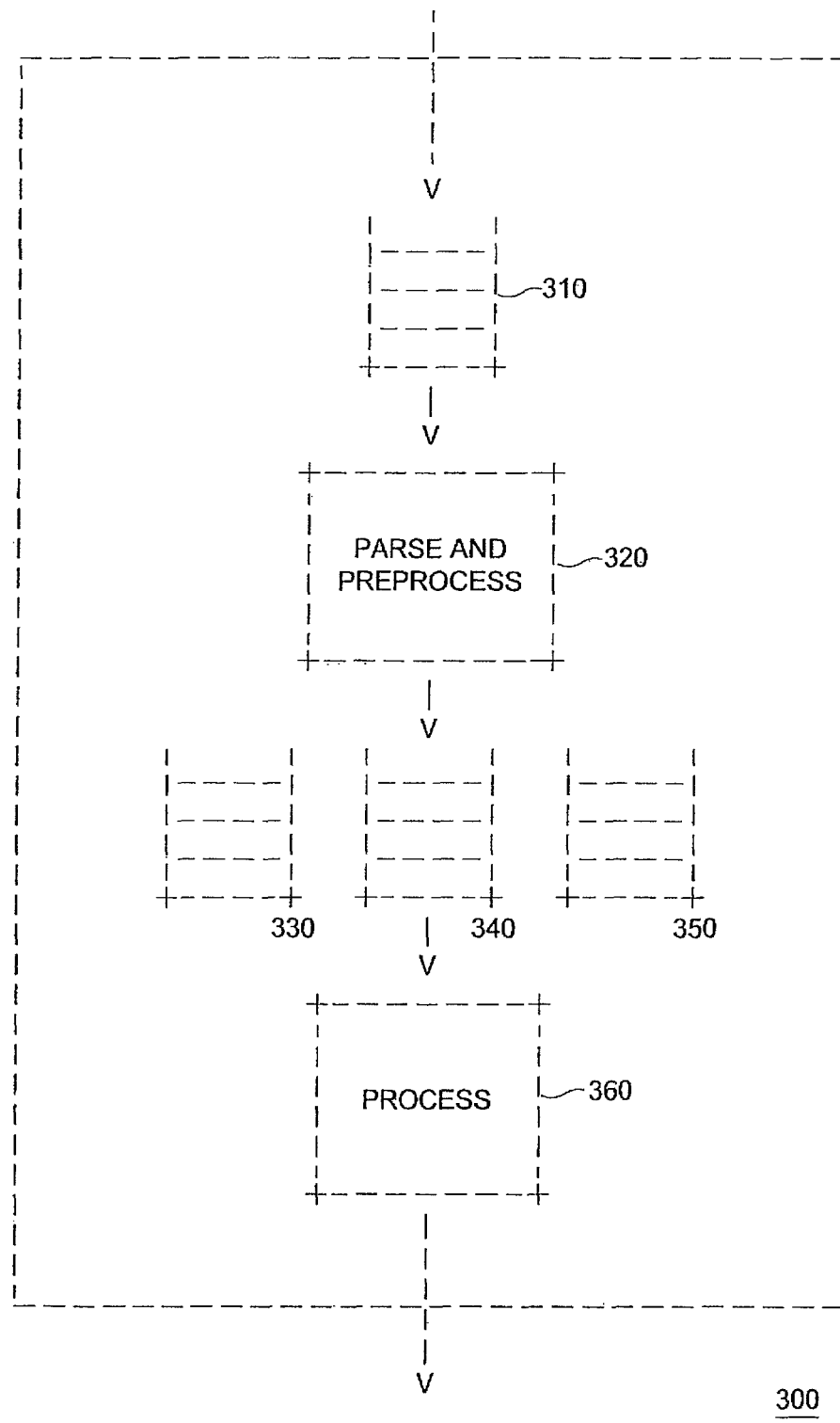
FIG. 3 illustrates an example two tier with three classes classification structure in a VoIP network of the present invention.

FIG. 3 illustrates an example 300 of the two tier with three classes signaling message classification scheme in a VoIP network of the present invention. In FIG. 3, all incoming signaling messages arrive first into queue 310. Then these messages are parsed and pre-processed by module 320. The IP header Differentiated Service Code Point (DSCP) field is used to determine the classes to which incoming signaling message belong. Once the classification is performed, signaling message are then queued into the appropriate classes, e.g., queue 330 for storing high priority messages, queue 340 for storing non-provisional messages, and queue 350 for storing provisional messages. Queued signaling messages in these queues are then processed by module 360 according to the present invention described herein.

Since SIP is an application layer protocol employing IP networks for transmissions, the actual SIP messages are encapsulated within IP packets while traversing through IP networks. When IP packets carrying SIP messages arrive at a SIP server, the SIP server needs to determine what type of SIP message is carried within an arriving IP packet first before placing it into a service queue. Thus, IP packet header needs to carry a SIP message identity. In one embodiment, the present invention uses an existing IP header field for classification purpose, such as the Differentiated Service Code Point (DSCP) field in the IP packet header. The DSCP field is an 8 bit field within the IP packet that can be used to prioritize the importance of the IP packet.

The marking for IP packets with encapsulated SIP messages is performed whenever a new SIP message is composed. For instance, when a call request arrives at a User Agent Client (UAC), a new SIP INVITE message is composed and created and the resulting IP packet is appropriately marked by the UAC. Note that some SIP messages are generated at SIP servers as responses to INVITE messages and their resulting IP packets will need to be marked accordingly before transmission as well.

Moreover, for any given call setup flow initiated at a SIP User Agent Client (UAC), there could be multiple SIP User Agent Servers (UAS) along the signaling path. Therefore, some SIP response messages will need to be forwarded by SIP servers that are not the origin of the SIP response messages. Queuing only occurs for those SIP messages that arrive at a SIP server and must wait for processing.

Figure 4:
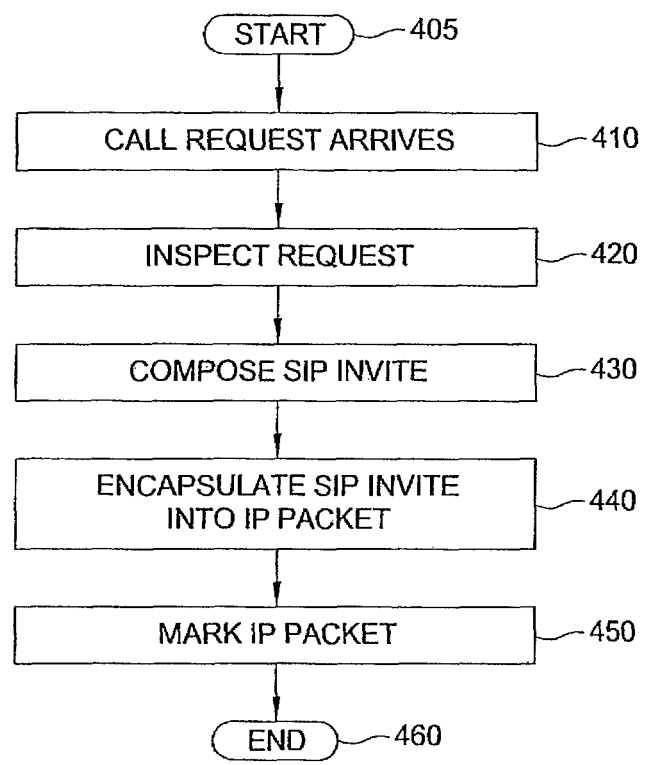
FIG. 4 illustrates a flowchart of a method for creating a call signaling message by a User Agent Client (UAC) in a packet network, e.g., a VoIP network, of the present invention.

FIG. 4 illustrates a flowchart of a method 400 for processing a call request by a SIP User Agent Client (UAC) in VoIP network, of the present invention. Method 400 starts in step 405 and proceeds to step 410.

In step 410, the method receives a call request at the UAC. In step 420, the method inspects the received call request to determine the classification of the call request. In one embodiment, the call request will be classified using the two tier and three class classification structure based on the customer type and the signaling message type. For example, the SIP INVITE signaling message for a call associated with a particular customer can be assigned to the high priority class.

In step 430, a SIP INVITE signaling message is composed and created. In step 440, the method encapsulates the composed SIP INVITE message within an IP packet. In step 450, the method marks the IP packet with the appropriate classification determined in step 420. In one embodiment, the IP packet is marked using the DSCP field in the IP packet header. The method ends in step 460.

The scheduling of signaling message for processing component of the present invention places SIP messages arriving at a SIP server into different signaling message service queues. When IP packets with SIP messages arrive at a SIP server, the packet headers are inspected and the packets are then placed into different queues. The SIP server then processes those SIP messages according to the defined service scheduling algorithm. In one embodiment, the present invention uses a service scheduling algorithm that takes into consideration the time sensitive nature of SIP messages.

In one embodiment, the scheduling algorithm is a hybrid scheduling algorithm that combines strict priority scheduling and First In First Out (FIFO) scheduling. The strict priority scheduling means that a SIP server will process SIP messages from low priority call queues only when the high priority call queue is empty. For all other low priority call queues, the SIP server will serve the SIP message that has the longest waiting time regardless of which low priority queue that the SIP message is in. Essentially, the SIP messages in the low priority queues are being served in FIFO fashion.

To ensure the proper order of services between two low priority queues, a message scheduler, is used to track the order of arrivals. Whenever a new message arrives, it will be time stamped. A record is entered into the message scheduler indicating the type of the message and its associated arrival time.

The reason for queuing low priority SIP messages into separate queues is to allow intelligent selective discarding of signaling messages under overload conditions.

For example, during a national disaster such as hurricane Katrina, calls from all over the world would be directed to the disaster sites, the number of call attempts will be overwhelmingly high even five or ten times higher than the normal load. Thus, the SIP servers may become the bottleneck. The existing SIP servers on the market will treat all the call attempts in a FIFO fashion. Under normal conditions, in a well engineered network, SIP messages can be handled in a timely fashion using FIFO serving discipline. However, under the overload conditions, the processing rate of a SIP server will become lower than the SIP message arrival rate, and will be accumulated in queues at the SIP server. Unfortunately, the arriving SIP messages will be discarded upon arrival when the queues reach their full capacity.

The issue associated with the FIFO treatment of all messages at SIP server is that the dropped messages can be the ones that trigger retransmission of SIP messages from originating UAC. Consequently, more messages are created to flood the already overloaded SIP servers. In a typical SIP call setup flow, it is essentially a three-way handshake session of involving SIP INVITE, SIP 200, and SIP ACK messages and a media session is terminated by a two-way handshake involving SIP BYE and SIP 200 messages. All other messages are provisional ones that will not trigger retransmission of messages toward a SIP server.

By putting different messages into different queues, one has the advantage of deciding whether to discard a low priority message already sitting in a queue so as to be able to accept the newly arrived high priority message.

Moreover, due to the time sensitive nature of non-provisional messages, serving a non-provisional message that has been sitting in the queue for too long is a waste of resources. Particularly when the volume of requests to high priority queue is unusually high, waiting time for the messages in the non-provisional queue can be significantly long. One way to overcome this problem is to discard the message from the head of the queue whenever it is necessary. It is sufficient to apply the head of queue dropping to the non-provisional queue only.

In the present invention, two mechanisms can be used to determine when a message should be dropped from the head of queue. One approach is the time expiration message discarding method, and another approach is the head drop trigger message discarding method.

In the time expiration message discarding method, a user configurable parameter, such as an expiration time, is introduced. The value of expiration time is the maximum allowable time that a non-provisional message can remain in the non-provisional queue. Whenever a message has to be deleted from the non-provisional queue, the waiting time of the head of queue will be checked first. If the waiting time is larger than the expiration time, the message will be deleted from the head of the queue rather than from the tail of the queue. Otherwise, the message form the tail of the queue will be discarded.

Figure 5A:
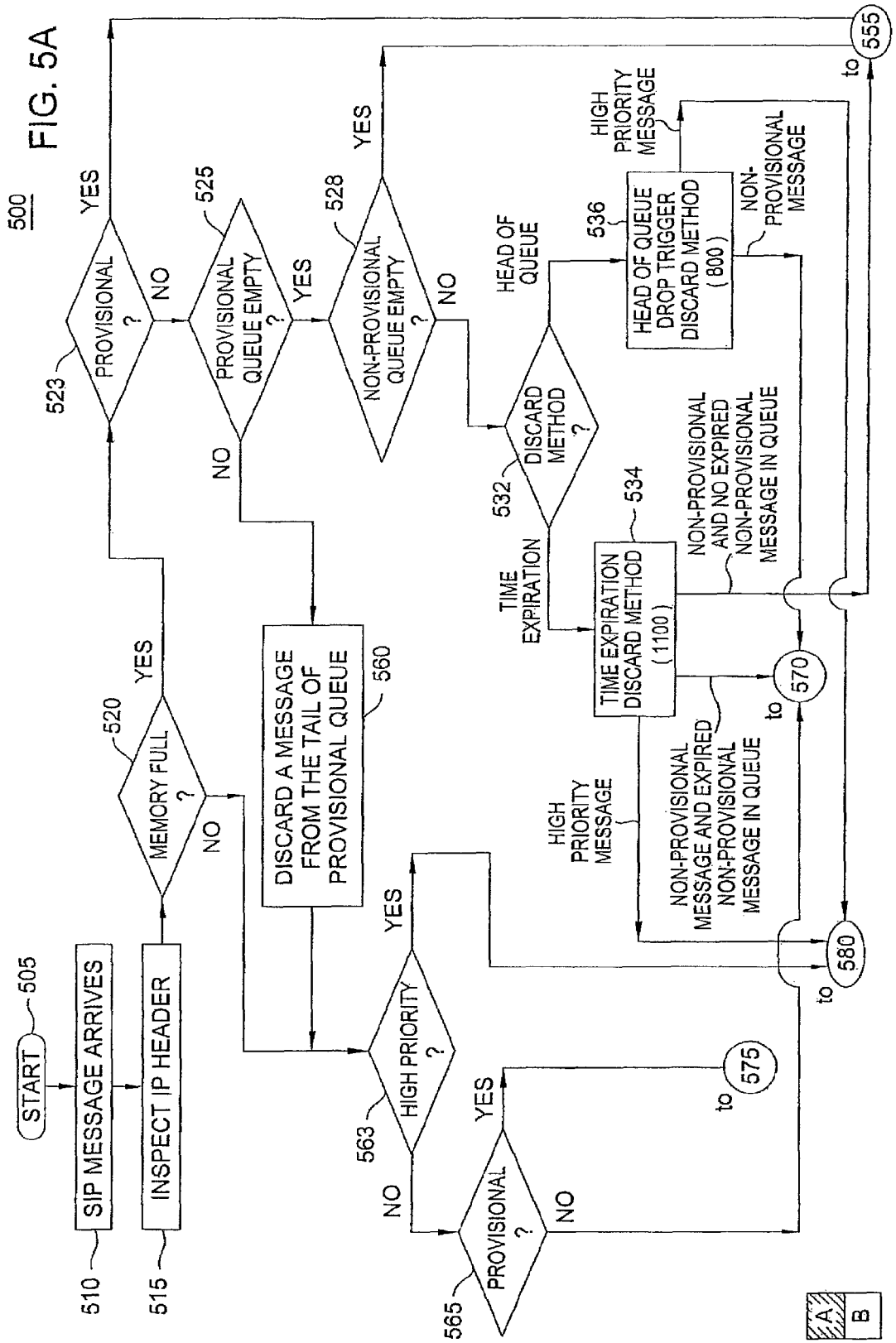
FIG. 5 (shown as FIG. 5A and FIG. 5B) illustrates a flowchart of a method for processing the arrival of a signaling message at a User Agent Server (UAS) in a packet network, e.g., a VoIP network, of the present invention.
Figure 5B:
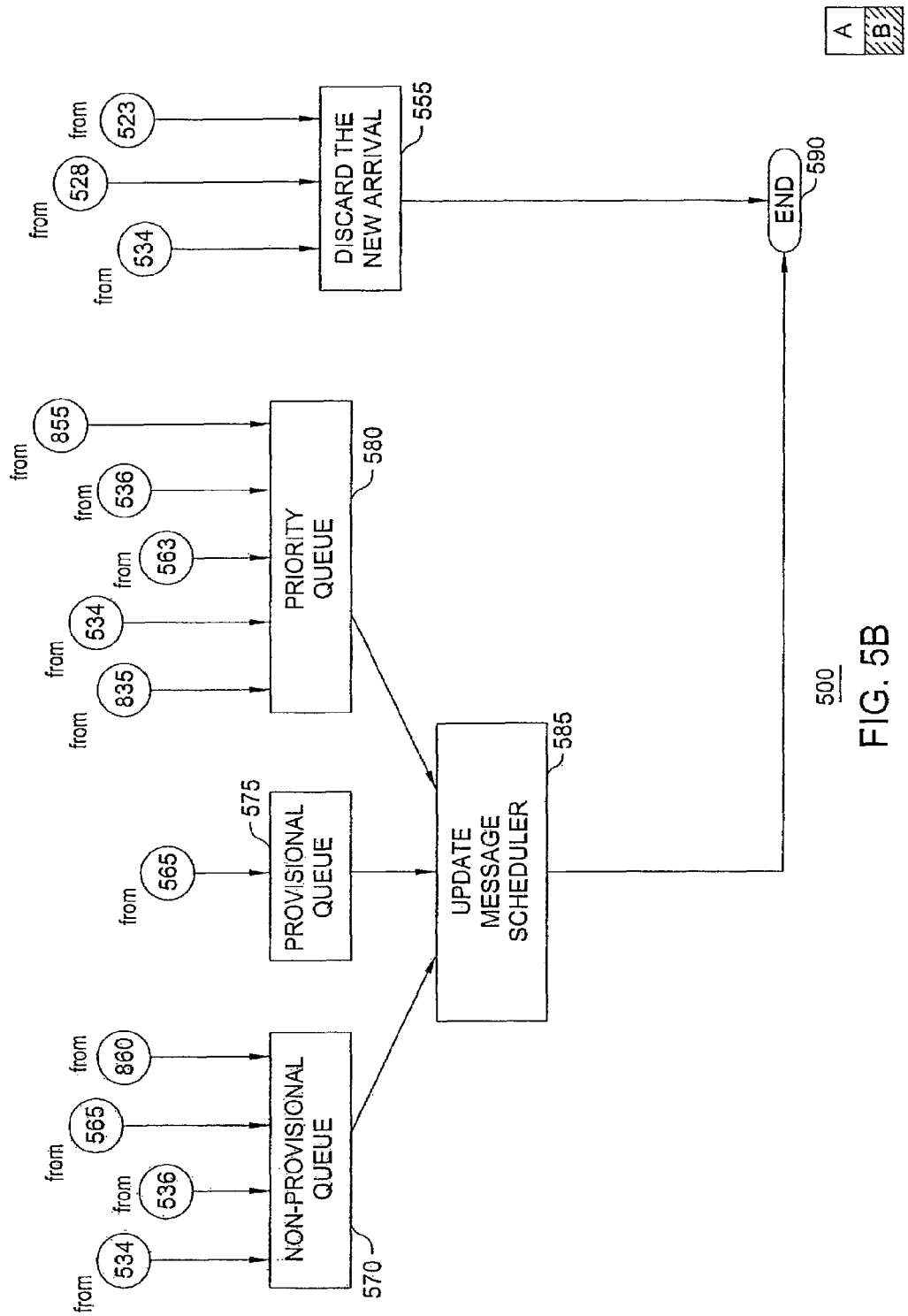

A detailed flowchart of the processing of an arrived signaling message is also provided in FIG. 5. FIG. 5 illustrates a flowchart of a method 500 for processing the arrival of a signaling message at a UAS in a VoIP network of the present invention. Method 500 starts in step 505 and proceeds to step 510.

In step 510, the method receives a SIP signaling message via an IP network. In step 515, the method inspects the IP header of the IP packet that is received. For example, the priority of the SIP message is extracted using information embedded in the IP packet header.

In step 520, the method checks if the SIP server memory is completely utilized. If the SIP server memory is completely utilized, the method proceeds to step 523; otherwise, the method proceeds to step 563.

In step 523, the method checks if the SIP message is a provisional signaling message. If the SIP message is a provisional signaling message, the method proceeds to step 555; otherwise, the method proceeds to step 525.

In step 525, the method checks if the provisional message queue is empty. If the provisional message queue is empty, the method proceeds to step 528; otherwise, the method proceeds to step 560.

In step 528, the method checks if the non-provisional message queue is empty. If the non-provisional message queue is empty, the method proceeds to step 555; otherwise, the method proceeds to step 532.

In step 532, the method checks the type of discard method to be used to drop signaling messages. If the time expiration discard method is used, the method proceeds to step 534. If the head of queue drop trigger discard method is used, the method proceeds to step 536.

In step 534, the method executes the time expiration discard method (as further described below in method 1100). After the execution of step 534, the method proceeds to step 555 if the received message is a non-provisional message and there is no time expired non-provisional message in the non-provisional message queue, or to step 570 if the received message is a non-provisional message and there is an expired message in the non-provisional message queue, or to step 580 if the received message is high priority message.

In step 536, the method executes the head of queue drop trigger discard method described in method 800. After the execution of step 536, the method proceeds to step 570 if the received message is a non-provisional message or to step 580 if the received message is a high priority message.

In step 555, the method discards the received signaling message. The method then proceeds to step 590.

In step 560, the method discards a message from the tail of the provisional message queue. The method then proceeds to step 563.

In step 563, the method checks if the received message is a high priority message. If the received message is a high priority message, the method proceeds to step 580; otherwise, the method proceeds to step 565.

In step 565, the method checks if the received message is a provisional message. If the received message is a provisional message, the method proceeds to step 575; otherwise, the method proceeds to step 570.

In step 570, the method places the received message into the provisional message queue. The method then proceeds to step 585.

In step 575, the method places the received message into the non-provisional message queue. The method then proceeds to step 585.

In step 580, the method places the received message into the high priority message queue. The method then proceeds to step 585.

In step 585, the method updates the message scheduler accordingly. The method then ends in step 590.

FIG. 11 illustrates a flowchart of a method 1100 for discarding signaling message from a non-provisional queue using time expiration in a VoIP network, of the present invention. Method 1100 starts when step 534 in method 500 is reached and the method proceeds to step 1110.

In step 1110, the method checks if the received message is a high priority message. If the received message is a high priority message, the method proceeds to step 1120; otherwise, the method proceeds to step 1150.

In step 1120, the method checks if the head of queue message in the non-provisional message queue has exceeded the expiration timer threshold. If the head of queue message in the non-provisional message queue has exceeded the expiration timer threshold, the method proceeds to step 1130; otherwise, the method proceeds to step 1140.

In step 1130, the method discards the head of queue message from the non-provisional message queue. The method then proceeds to step 580 in method 500.

In step 1140, the method discards the tail of queue message from the non-provisional message queue. The method then proceeds to step 580 in method 500.

In step 1150, the method checks if the head of queue message in the non-provisional message queue has exceeded the expiration timer threshold. If the head of queue message in the non-provisional message queue has exceeded the expiration timer threshold, the method proceeds to step 1160; otherwise, the method proceeds to step 555 in method 500.

In step 1160, the method discards the head of queue message from the non-provisional message queue. The method then proceeds to step 570 in method 500.

In the head drop trigger message discarding method, a user configurable parameter, such as a head of queue drop trigger, is introduced. Whenever a signaling message in the non-provisional queue is deleted due to high priority message arrivals, the server is spending more time on the high priority queue. It indicates that the messages in the non-provisional queue have to wait longer to be served. If a significant number of messages are deleted from the non-provisional queue since the last non-provisional message was served, there is a very high likelihood that the signaling message waiting at the head of the non-provisional queue is too old to be meaningful. Thus, if the number of deleted messages from non-provisional queue exceeds the user configured parameter of the head of queue drop trigger, the head of queue discard will be performed if a non-provisional message has to be dropped.

To implement the head drop trigger message discarding method, the concept of dropping zone is introduced. There are two dropping zones, the tail of queue dropping zone and the head of queue dropping zone. Furthermore, a dropping counter to keep track of number of consecutive tail of queue drops from the non-provisional queue is introduced. Consecutive dropping is defined to be the number of discard for non-provisional signaling messages since the last non-provisional message was served. When the dropping counter exceeds the head of queue drop trigger, the dropping zone is the head of queue dropping zone, otherwise it is the tail of queue dropping zone. If the dropping zone is in the tail of queue dropping zone, the dropping counter is reset to zero whenever a non-provisional message is served or scheduled. If it is in the head of queue dropping zone, the dropping counter is decremented by one whenever a head of queue discard occurs until it is zero.

Figure 8:
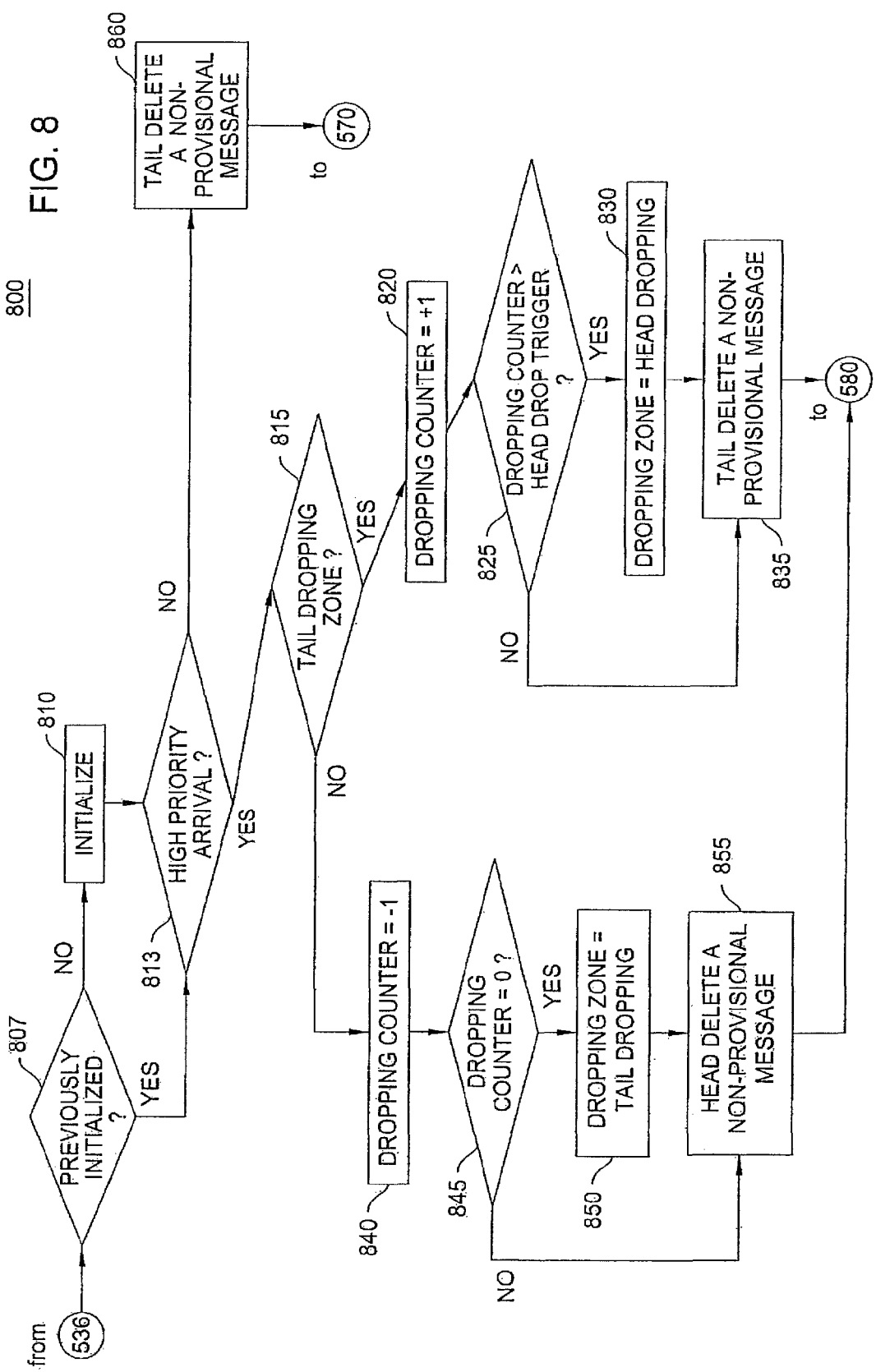
FIG. 8 illustrates a flowchart of a method for discarding signaling message from a non-provisional queue using head of queue drop trigger in a packet network, e.g., a VoIP network, of the present invention.

FIG. 8 illustrates a flowchart of a method 800 for discarding a signaling message from a non-provisional queue using head of queue drop trigger in a VoIP network of the present invention. Method 800 starts when step 536 in method 500 is reached and the method proceeds to step 807.

In step 807, the method checks to verify if the method has previously been initialized already. If the method has previously been initialized already, the method proceeds to step 813; otherwise, the method proceeds to step 810.

In step 810, the method initializes the dropping counter parameter to 0 and the dropping zone to tail of queue dropping when an initial signaling message arrives. The dropping counter parameter keeps track of the number of consecutive tail of queue drops from the non-provisional queue. The dropping zone parameter can either be the tail of queue dropping zone or the head of queue dropping zone, indicating signaling message shall be discarded from the tail of queue or the head of queue, respectively.

In step 813, the method determines if the received signaling message is a high priority message. If the received signaling message is a high priority message, the method proceeds to step 815; otherwise, the method proceeds to step 860.

In step 815, the method checks if the dropping zone parameter is set to the tail of queue dropping zone. If the dropping zone parameter is set to the tail of queue dropping zone, the method proceeds to step 820; otherwise, the method proceeds to step 840.

In step 820, the method increments the dropping counter parameter by 1.

In step 825, the method checks if the dropping counter value exceeds the head of queue drop trigger parameter. Note that the head of queue drop trigger parameter is a user configurable parameter set by the user. If the dropping counter value exceeds the head of queue drop trigger parameter, the method proceeds to step 830; otherwise, the method proceeds to step 835.

In step 830, the method sets the dropping zone parameter to the head of queue dropping zone.

In step 835, the method discards a non-provisional signaling message from the tail of the non-provisional queue. The method then proceeds to step 580 in method 500.

In step 840, the method decrements the dropping counter parameter by 1.

In step 845, the method checks if the dropping counter parameter value is 0. If the dropping counter parameter value is 0, the method proceeds to step 850; otherwise, the method proceeds to step 855.

In step 850, the method sets the dropping zone parameter to the tail of queue dropping zone. In step 855, the method discards a non-provisional signaling message from the head of the non-provisional queue. The method then proceeds to step 580 in method 500.

In step 860, the method discards a non-provisional signaling message from the tail of the non-provisional queue. The method then proceeds to step 570 in method 500.

Figure 9:
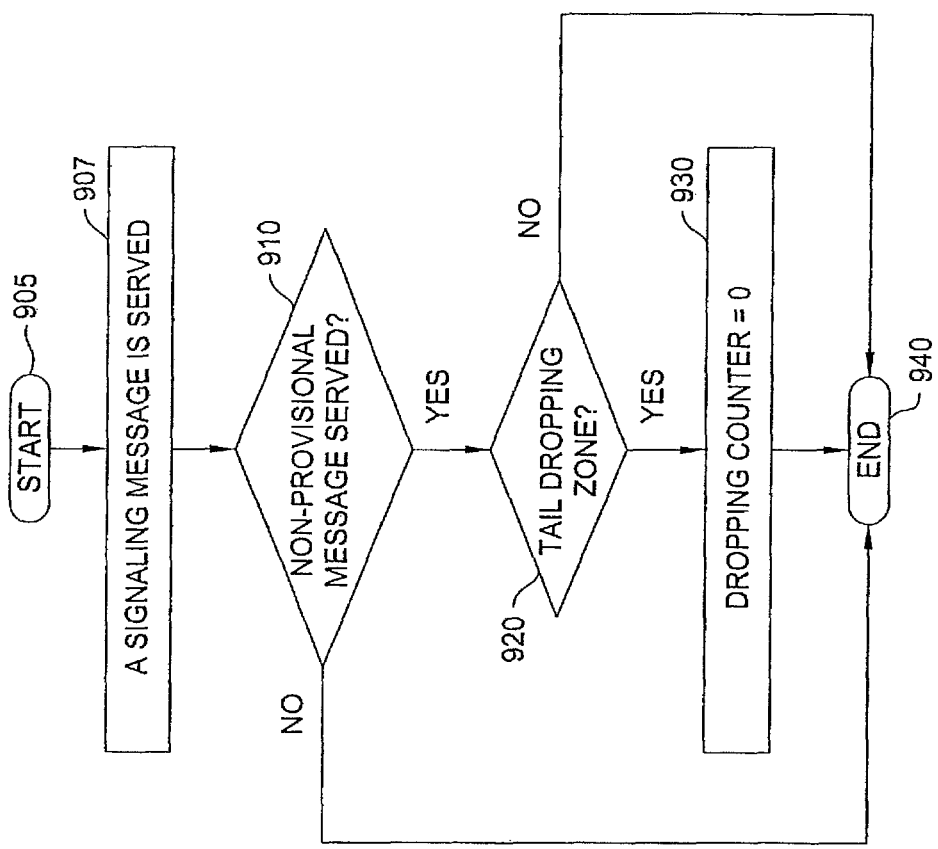
FIG. 9 illustrates a flowchart of a method for resetting the dropping counter parameter in a packet network, e.g., a VoIP network, of the present invention.

FIG. 9 illustrates a flowchart of a method 900 for resetting the dropping counter parameter in a VoIP network of the present invention. Method 900 starts in step 905 and proceeds to step 907.

In step 907, a signaling message is served by a signaling server. In step 910, the method checks if the next signaling message to be processed is a message from the non-provisional queue. If the next signaling message to be processed is a message from the non-provisional queue, the method proceeds to step 920; otherwise, the method proceeds to step 940.

In step 920, the method checks if the dropping zone parameter is set to the tail of queue dropping zone. If the dropping zone parameter is set to the tail of queue dropping zone, the method proceeds to step 930; otherwise, the method proceeds to step 940.

In step 930, the method resets the dropping counter parameter to a value of 0. The method ends in step 940.

Compared to threshold based queue management schemes, another advantage of separate queues for SIP messages is to maximize utilization of the memory space in a SIP server. The four associated procedures that are performed by a SIP server will be described as follows.

In a first procedure, in order to facilitate the differential treatment of SIP messages in a SIP server, the classification rules are programmed into the SIP server. A user interface is used by service providers to define and configure rules within the server according to service needs.

In a second procedure, a message scheduler is used to track the order of arrival of SIP signaling messages, including both provisional and non-provisional signaling messages, which do not belong to high priority queue. Whenever such a new SIP signaling message arrives, the arrival order is recorded into the message scheduler. Whenever a message is processed, the associated record is eliminated from the message scheduler.

FIG. 7 illustrates an example message scheduler 700 in a VoIP network of the present invention. State 710 illustrates the initial state of the message scheduler before a signaling message, either provisional or non-provisional, is served by a SIP signaling server. State 720 illustrates the state of the message scheduler after the head of queue provisional signaling message is served. State 730 illustrates the state of the message scheduler after a provisional signaling message is received and inserted into the tail of queue.

In a third procedure, a SIP signaling message that arrives at a User Agent Server (UAS) is processed. The pseudo code of the processing of an arrived signaling message is given below.

If it is from a higher priority source,
  If the memory space is not full
  Put it into high priority queue
  Else
    Discard a SIP message from provisional queue
    Put the newly arrived message into high priority queue
Else
Update Message Scheduler—enter its record
If it is not a provisional message (determined by rules)
  If the memory space is not full
    Put it into a non-provisional queue
  Else
    Discard a provisional message from provisional queue
  Put the newly arrived message into non-provisional queue
Else
  If the memory space is not full
  Put it into a provisional queue
  Else
    Discard the newly arrived SIP message In a fourth procedure, the signaling messages in the various message queues are served by the UAS. The pseudo code of this processing is given below.

If high priority queue is not empty
  Process a SIP message from the high priority queue
Else
  Check the Message Scheduler and select the SIP message accordingly
  Process the chosen SIP message
  Update the Message Scheduler—eliminate its record
Ready to process next message A detailed flowchart of the serving of signaling messages in various signaling message queues is provided in FIG. 6. FIG. 6 illustrates a flowchart of a method 600 for serving signaling messages in signaling message queues at a UAS in a VoIP network of the present invention. Method 600 starts in step 605 and proceeds to step 610.

In step 610, the method awaits to serve the next SIP message in signaling message queues after a previous message has been served.

In step 615, the method checks if the high priority message queue is empty. If the high priority message queue is empty, the method proceeds to step 620; otherwise, the method proceeds to step 645.

In step 620, the method checks if the message scheduler is empty. If the message scheduler is empty, the method proceeds back to step 610; otherwise, the method proceeds to step 625.

In step 625, the method checks if the next signaling message to be served is a message from the provisional message queue according to the message scheduler. If the next signaling message to be served is a message from the provisional message queue according to the message scheduler, the method proceeds to step 630; otherwise, the method proceeds to step 635.

In step 630, the method processes the signaling message from the head of queue of the provisional message queue. The method then proceeds to step 640.

In step 635, the method processes the signaling message from the head of queue of the non-provisional message queue. The method then proceeds to step 640.

In step 640, the method updates the message scheduler accordingly after a signaling message has been processed. The method then proceeds back to step 610.

In step 645, the method processes a signaling message from the head of queue of the high priority message queue. The method then proceeds to step 610.

This fourth procedure guarantees call setup of high priority calls. While the third procedure effectively serves as an overload control mechanism to minimize the SIP message retransmissions due to loss of non-provisional messages so as to increase the resource utilization as well as the successful call setup rate.

It should be noted that although not specifically specified, one or more steps of methods 400, 500, 600, 800, 900, and 1100 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIGS. 4, 5, 6, 8, 9, and 11 that recite a determining operation or involve a decision, do not necessarily require that both branches of the determining operation be practiced. In other words, one of the branches of the determining operation can be deemed as an optional step.

Figure 10:
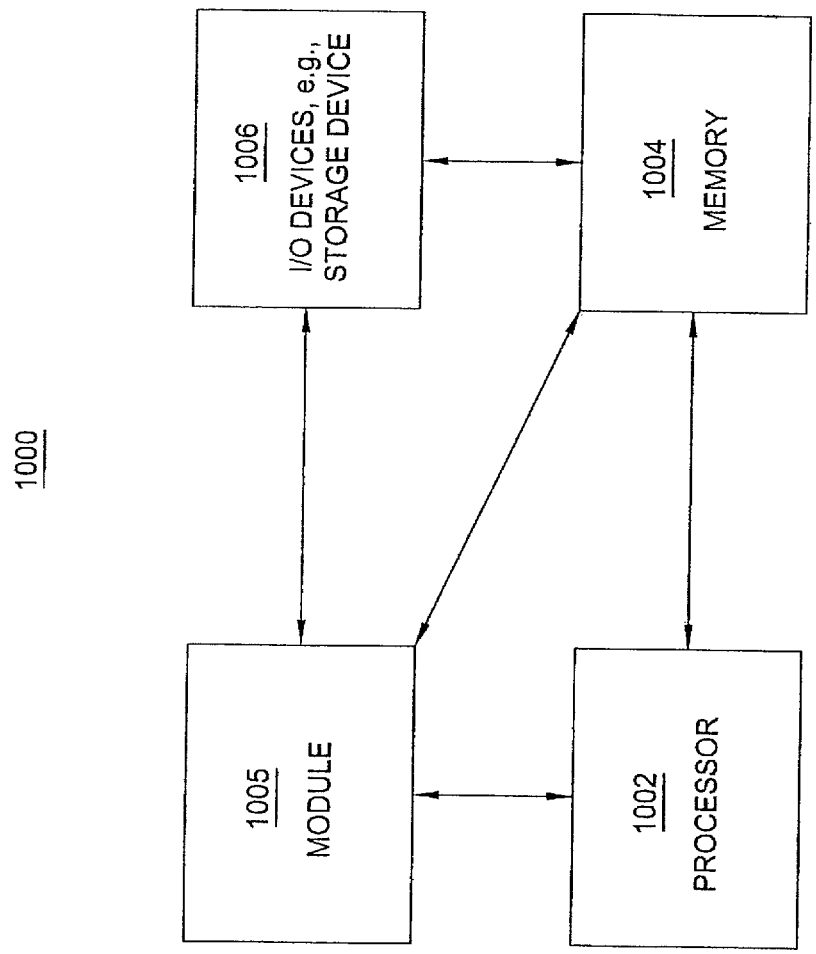
FIG. 10 illustrates a high level block diagram of a general purpose computer suitable for use in performing the functions described herein.

FIG. 10 depicts a high level block diagram of a general purpose computer suitable for use in performing the functions described herein. As depicted in FIG. 10, the system 1000 comprises a process serving signaling messages in signaling message queues at a UAS or element 1002 (e.g., a CPU), a memory 1004, e.g., random access memory (RAM) and/or read only memory (ROM), a module 1005 for prioritizing VoIP signaling messages, and various input/output devices 1006 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 1005 for prioritizing VoIP signaling messages can be loaded into memory 1004 and executed by processor 1002 to implement the functions as discussed above. As such, the present process 1005 for prioritizing VoIP signaling messages (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for discarding a signaling message in a communication network, the method comprising:
 receiving, by a processor, the signaling message;
 classifying, by the processor, the signaling message;
 scheduling, by the processor, the signaling message for processing;
 discarding, by the processor, selectively the signaling message that has been scheduled under an overload condition, wherein the discarding comprises:
  discarding the signaling message that has been scheduled from a tail of a provisional message queue when the provisional message queue is not empty, when a high priority message or a non-provisional signaling message is newly received and when the signaling message is a provisional signaling message; and
  discarding the signaling message that has been scheduled from a non-provisional message queue when the provisional message queue is empty and the non-provisional message queue is not empty, when a high priority message or a non-provisional signaling message is newly received and when the signaling message is a non-provisional signaling message, wherein the discarding the signaling message that has been scheduled from the non-provisional message queue comprises a time expiration discard method, wherein the time expiration discard method comprises:
   discarding the signaling message from a head of the non-provisional message queue when the signaling message is at the head of the non-provisional message queue and when a waiting time of the signaling message at the head of the non-provisional message queue has exceeded a predetermined expiration time threshold; and
   discarding the signaling message from a tail of the non-provisional message queue when the signaling message is at the tail of the non-provisional message queue, when a waiting time of a different signaling message at the head of the non-provisional message queue has not yet exceeded the predetermined expiration time threshold and when the newly received signaling message is a high priority message;
  discarding a newly received signaling message under the overload condition when the newly received signaling message is a provisional signaling message; and
  discarding the newly received signaling message under the overload condition when both of the provisional message queue and the non-provisional message queue are empty.

2. The method of claim 1, wherein the communication network is a voice over internet protocol network.

3. The method of claim 1, wherein the signaling message is classified into one of: a high priority, a non-provisional priority, or a provisional priority.

4. The method of claim 3, wherein the signaling message is classified based on a customer type and a signaling message type by a user agent client.

5. The method of claim 3, wherein the signaling message is classified based on a customer type and a signaling message type by a user agent server.

6. The method of claim 3, wherein the scheduling comprises:
 placing the signaling message into one of a plurality of class processing queues;
 scheduling all signaling messages classified as high priority to be processed before signaling messages classified as non-provisional priority, or as provisional priority; and
 scheduling signaling messages classified as non-provisional priority, or as provisional priority, using a first in first out order.

7. A non-transitory computer-readable medium storing a plurality of instructions which, when executed by a processor, cause the processor to perform operations for discarding a signaling message in a communication network, the operations comprising:
 receiving the signaling message;
 classifying the signaling message;
 scheduling the signaling message for processing;
 discarding selectively the signaling message that has been scheduled under an overload condition, wherein the discarding comprises:
  discarding the signaling message that has been scheduled from a tail of a provisional message queue when the provisional message queue is not empty, when a high priority message or a non-provisional signaling message is newly received and when the signaling message is a provisional signaling message; and discarding the signaling message that has been scheduled from a non-provisional message queue when the provisional message queue is empty and the non-provisional message queue is not empty, when a high priority message or a non-provisional signaling message is newly received and when the signaling message is a non-provisional signaling message, wherein the discarding the signaling message that has been scheduled from the non-provisional message queue comprises a time expiration discard method, wherein the time expiration discard method comprises:

discarding the signaling message from a head of the non-provisional message queue when the signaling message is at the head of the non-provisional message queue and when a waiting time of the signaling message at the head of the non-provisional message queue has exceeded a predetermined expiration time threshold; and discarding the signaling message from a tail of the non-provisional message queue when the signaling message is at the tail of the non-provisional message queue, when a waiting time of a different signaling message at the head of the non-provisional message queue has not yet exceeded the predetermined expiration time threshold and when the newly received signaling message is a high priority message;

discarding a newly received signaling message under the overload condition when the newly received signaling message is a provisional signaling message; and discarding the newly received signaling message under the overload condition when both of the provisional message queue and the non-provisional message queue are empty.

8. The non-transitory computer-readable medium of claim 7, wherein the communication network is a voice over internet protocol network.

9. The non-transitory computer-readable medium of claim 7, wherein the signaling message is classified into one of: a high priority, a non-provisional priority, or a provisional priority.

10. The non-transitory computer-readable medium of claim 9, wherein the signaling message is classified based on a customer type and a signaling message type by a user agent client.

11. The non-transitory computer-readable medium of claim 9, wherein the signaling message is classified based on a customer type and a signaling message type by a user agent server.

12. The non-transitory computer-readable medium of claim 9, wherein the scheduling comprises:

placing the signaling message into one of a plurality of class processing queues;

scheduling all signaling messages classified as high priority to be processed before signaling messages classified as non-provisional priority, or as provisional priority; and scheduling signaling messages classified as non-provisional priority, or as provisional priority, using a first in first out order.

13. An apparatus for discarding a signaling message in a communication network, the apparatus comprising:

a processor; and a computer-readable medium storing a plurality of instructions which, when executed by the processor, cause the processor to perform operations, the operations comprising:

receiving the signaling message;

classifying the signaling message;

scheduling the signaling message for processing;

discarding selectively the signaling message that has been scheduled under an overload condition, wherein the discarding comprises:

discarding the signaling message that has been scheduled from a tail of a provisional message queue when the provisional message queue is not empty, when a high priority message or a non-provisional signaling message is newly received and when the signaling message is a provisional signaling message; and discarding the signaling message that has been scheduled from a non-provisional message queue when the provisional message queue is empty and the non-provisional message queue is not empty, when a high priority message or a non-provisional signaling message is newly received and when the signaling message is a non-provisional signaling message, wherein the discarding the signaling message that has been scheduled from the non-provisional message queue comprises a time expiration discard method, wherein the time expiration discard method comprises:

discarding the signaling message from a head of the non-provisional message queue when the signaling message is at the head of the non-provisional message queue and when a waiting time of the signaling message at the head of the non-provisional message queue has exceeded a predetermined expiration time threshold; and discarding the signaling message from a tail of the non-provisional message queue when the signaling message is at the tail of the non-provisional message queue, when a waiting time of a different signaling message at the head of the non-provisional message queue has not yet exceeded the predetermined expiration time threshold and when the newly received signaling message is a high priority message;

discarding a newly received signaling message under the overload condition when the newly received signaling message is a provisional signaling message; and discarding the newly received signaling message under the overload condition when both of the provisional message queue and the non-provisional message queue are empty.

14. The apparatus of claim 13, wherein the communication network is a voice over Internet protocol network.

15. The apparatus of claim 13, wherein the signaling message is classified into one of: a high priority, a non-provisional priority, or a provisional priority.

16. The apparatus of claim 15, wherein the signaling message is classified based on a customer type and a signaling message type by a user agent client.

17. The apparatus of claim 15, wherein the signaling message is classified based on a customer type and a signaling message type by a user agent server.

18. The apparatus of claim 15, wherein the scheduling comprises:
- placing the signaling message into one of a plurality of class processing queues;
- scheduling all signaling messages classified as high priority to be processed before signaling messages classified as non-provisional priority, or as provisional priority; and
- scheduling signaling messages classified as non-provisional priority, or as provisional priority, using a first in first out order.

* * * * *